Jan. 30, 1934.   J. E. BROWN   1,945,419
EMBALMER'S APPARATUS
Filed Dec. 21, 1931
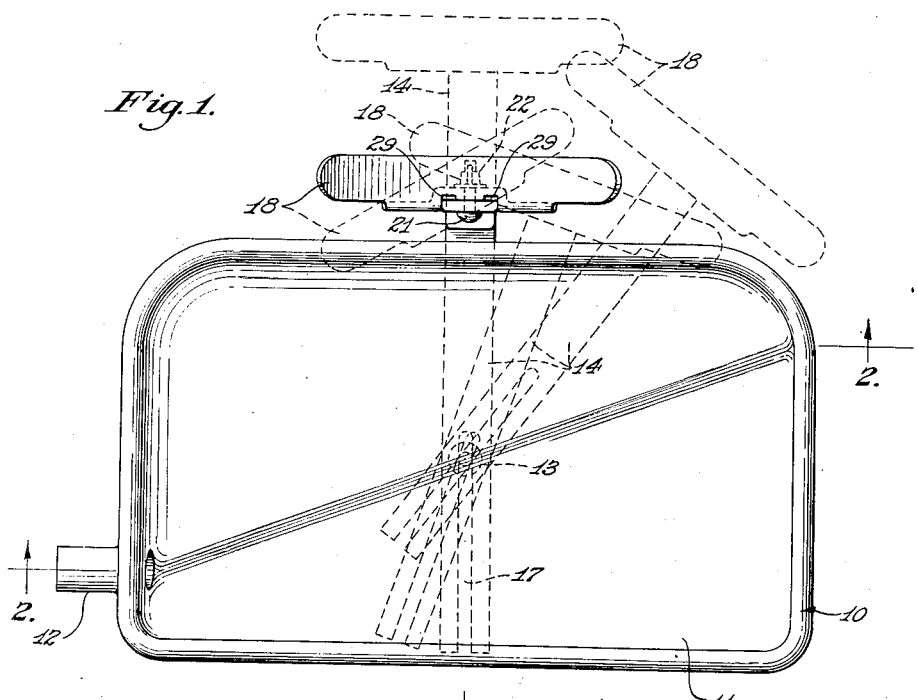
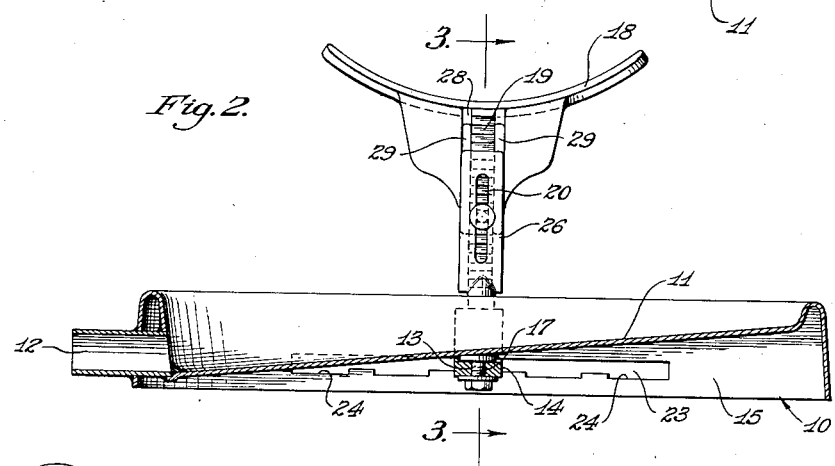
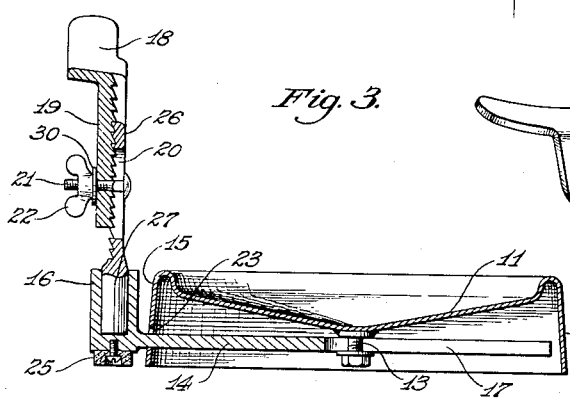
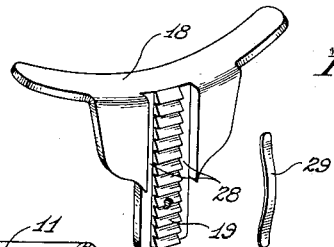
James E. Brown,
INVENTOR
BY Victor J. Evans & Co.
HIS ATTORNEYS Patented Jan. 30, 1934

1,945,419

UNITED STATES PATENT OFFICE 1,945,419

EMBALMER'S APPARATUS

James E. Brown, South Chicago, Ill.

Application December 21, 1931
Serial No. 582,433

3 Claims. (Cl. 27—23)

This invention relates to certain novel improvements in embalmer's apparatus, and has for its principal object the provision of an improved construction of this character which will be highly efficient in use and economical in manufacture.

Among the objects of this invention are to provide an improved embalmer's drain pan and an adjustable head rest associated therewith in a novel manner to hold the head at the desired position while operating on either the carotid, brachial or axillary arteries; and to provide a device so constructed that the weight of the head of the body will be distributed in such a manner that the drain pan will be held flush with the back of the body to keep the pan from capsizing; and to provide a device which may be used for the hair washing operation.

Other objects will appear hereinafter.

The invention consist in the novel combination and arrangement of parts to be hereinafter described and claimed.

The invention will be best understood by reference to the accompanying drawing showing the preferred form of construction, and in which:

Fig. 1 is a top plan view of the invention;

Fig. 2 is a sectional view on line 2—2 in Fig. 1;

Fig. 3 is a sectional view on line 3—3 in Fig. 2; and

Fig. 4 is a fragmentary perspective view of the head rest.

Referring to the drawing, which illustrates a preferred and practical embodiment of the invention, my improved device comprises a base in the form of a drain pan 10, the bottom 11 of which drains toward an outlet 12 which may be connected to a suitable receptacle.

Pivotally mounted on and below the bottom 11 of the base or drain pan, as on a stud 13, is a head rest supporting member 14 which extends back toward, and projects beyond, the rear wall 15 of the pan; said member 14 having an upturned portion 16 at its outer end. A slot 17 is provided in the member 14 and the stud 13 projects through this slot whereby the member 14, and the head rest 18 carried by the upturned portion 16 of the member 14, may be slidably moved toward and from the pan which permits the member 14 and head rest 18 to be moved radially about the pivot stud 13, into positions such as shown in dotted lines in Fig. 1.

The head rest 18 includes a depending rack bar 19 which is slidably fitted to an upright rack bar 26 which has a portion 27 that is rotatably mounted in the upright portion 16 of the member 14 and this bar 26 has provided therein a vertical slot 20 through which projects a bolt or like element 21 that is mounted in the rack bar 19; said element 21 carrying a wing nut 22 whereby to latch the head rest 18 to the upright rack bar 26 in various vertically adjusted positions.

Provided in the rear wall 15 of the pan is a slot 23 through which the head rest supporting member 14 projects and the bottom edge of this slot 23 is provided with a series of notches 24 in which the member 14 may be selectively and releasably latched to secure said member, the upright rack bar 26, and the head rest 18 in a preselected position radially about the pivot 13, as shown in dotted line in Fig. 1, whereby the head of the body may be moved with the head rest 18 without capsizing the pan 10 since the back of the body will at all times rest flush upon the pan when the head is moved on the head rest 18 radially about the pivot 13.

The head rest 18 may be adjusted vertically and clamped in a preselected position by adjusting the wing nut 22 whereby the pan may be used as a hair washing pan.

Attached to the member 14 is a resilient and, preferably, rubber block 25 which is adapted to grip the surface upon which the pan rests whereby to prevent slipping of the member 14 and the head rest 18.

Arranged in grooves 28 in the rack bar 19 are resilient elements in the form of flat springs 29 which urge the rack bars 19 and 26 apart and the bar 19 into engagement with the washer 30 on bolt 21 whereby to prevent the rack bar 19 and head rest 18 from collapsing or falling when loosening the wing nut 22 to adjust the rack bars 19 and 26 relative to each other.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. Embalmer's apparatus, comprising: a base having an upstanding wall; said wall having a slot formed therein and having a series of notches formed therein and spaced at intervals along said slot; a supporting member projected through said slot and selectively receivable in said notches; a head rest carried by said member; and said supporting member having a pivotal connection to said base for movement with said head rest and relative to said base, radially in a horizontal plane, about the said pivotal connection of said supporting member with said base.

2. Embalmer's apparatus, comprising: a base having an upstanding wall; said wall having a slot formed therein and having a series of notches formed therein and spaced at intervals along said slot; a supporting member projected through said slot and selectively receivable in said notches; a head rest carried by said member; and said supporting member having a pivotal connection to said base for movement with said head rest and relative to said base, radially in a horizontal plane, about the said pivotal connection of said supporting member with said base; said supporting member also having a slidable connection to said base for extensible movement in a horizontal plane, with said head rest, relative to said base.

3. Embalmer's apparatus, comprising: a base in the form of a drain having an upstanding rear wall provided with a horizontally extending slot; said wall having a series of notches formed therein and said notches being spaced at intervals along said slot; a head rest supporting member projecting horizontally through said slot and selectively latchable in said notches, said supporting member having a longitudinally extending slot formed therein; and an element projecting from the bottom of said pan downwardly through said slot providing a pivotal and slidable connection between said base and said supporting member.

JAMES E. BROWN.